United States Patent
Callard et al.

(10) Patent No.: US 9,344,123 B2
(45) Date of Patent: May 17, 2016

(54) SYSTEMS AND METHODS FOR HISTORICAL SIGNAL INTERFERENCE CANCELLATION (SIC)

(71) Applicant: Huawei Technologies Co., Ltd., Shenzhen (CN)

(72) Inventors: Aaron James Callard, Ottawa (CA); Hamidreza Farmanbar, Ottawa (CA); Alex Stephenne, Stittsville (CA); Ngoc Dung Dao, Ottawa (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 26 days.

(21) Appl. No.: 13/680,894

(22) Filed: Nov. 19, 2012

(65) Prior Publication Data

US 2014/0140451 A1    May 22, 2014

(51) Int. Cl.
  *H04B 1/10* (2006.01)
  *H04L 1/18* (2006.01)
  *H04L 27/26* (2006.01)
  *H04L 12/413* (2006.01)
  *H04B 1/7103* (2011.01)
  *H04L 25/03* (2006.01)
  *H04B 15/00* (2006.01)
  *H04L 1/00* (2006.01)
  *H04L 5/00* (2006.01)

(52) U.S. Cl.
  CPC ............ *H04B 1/1027* (2013.01); *H04L 1/1819* (2013.01); *H04L 1/1845* (2013.01); *H04B 1/10* (2013.01); *H04B 1/7103* (2013.01); *H04B 15/00* (2013.01); *H04L 5/0048* (2013.01); *H04L 5/0053* (2013.01); *H04L 5/0073* (2013.01); *H04L 12/413* (2013.01); *H04L 25/03006* (2013.01); *H04L 27/2691* (2013.01); *H04L 2001/0097* (2013.01)

(58) Field of Classification Search
  CPC ...... H04B 1/10; H04B 1/1027; H04B 1/7103; H04B 15/00; H04L 5/0073; H04L 25/03006; H04L 27/2691; H04L 12/413
  See application file for complete search history.

(56) References Cited

U.S. PATENT DOCUMENTS

| | | | |
|---|---|---|---|
| 7,426,201 B2 | 9/2008 | Kim et al. | |
| 7,885,176 B2 | 2/2011 | Pi et al. | |
| 8,514,721 B2 | 8/2013 | Luo et al. | |
| 8,576,792 B2 | 11/2013 | Kim et al. | |

(Continued)

OTHER PUBLICATIONS

Tsatsanis, M.K.; Ruifeng Zhang; Banerjee, S., "Network-assisted diversity for random access wireless networks," Signal Processing, IEEE Transactions on , vol. 48, No. 3, pp. 702,711, Mar. 2000.*

(Continued)

*Primary Examiner* — Ross Varndell
(74) *Attorney, Agent, or Firm* — Slater & Matsil, L.L.P.

(57) ABSTRACT

Historical decoding in accordance with signal interference cancellation (SIC) or joint processing may reduce the amount of data that is re-transported across a network following an unsuccessful attempt to decode a data transmission. In one example, historical decoding is performed in accordance with interference cancellation by communicating information related to interfering data (rather than information related to serving data) following a served receiver's unsuccessful attempt to decode an interference signal. The information related to the interfering data may be the information bits carried by the earlier interfering data transmission or parity information (e.g., forward error correction (FEC) bits, etc.) related to the earlier interfering data transmission.

27 Claims, 9 Drawing Sheets

(56) References Cited

U.S. PATENT DOCUMENTS

| | | |
|---|---|---|
| 2009/0158110 A1 | 6/2009 | Park et al. |
| 2009/0276674 A1 | 11/2009 | Wei et al. |
| 2010/0098006 A1* | 4/2010 | Golitschek Edler Von Elbwart et al. .............. 370/329 |
| 2010/0125764 A1 | 5/2010 | Kose |
| 2010/0220608 A1 | 9/2010 | Skillermark et al. |
| 2010/0317291 A1* | 12/2010 | Richardson .................. 455/63.1 |
| 2010/0322165 A1* | 12/2010 | Yoo ............................. 370/329 |
| 2011/0013615 A1 | 1/2011 | Lee et al. |
| 2011/0099446 A1 | 4/2011 | Murakami |
| 2011/0110304 A1* | 5/2011 | Kuchi et al. .................... 370/328 |
| 2011/0119548 A1* | 5/2011 | Imamura et al. .............. 714/748 |
| 2013/0083742 A1 | 4/2013 | Baldemair et al. |
| 2013/0136049 A1* | 5/2013 | Song et al. .................... 370/312 |
| 2014/0140336 A1 | 5/2014 | Callard et al. |

OTHER PUBLICATIONS

Tsatsanis, M., et al., "Network-assisted diversity for random access wireless networks," IEEE Transactions on Signal Processing, vol. 48, No. 3, Mar. 2000, pp. 702-711.

* cited by examiner

| User\Time | T1 | T2 |
|---|---|---|
| UE 221 | Data-1 | NA |
| UE 222 | Data-2 | Data-2 |
| Other UE | NA | Data-3 |

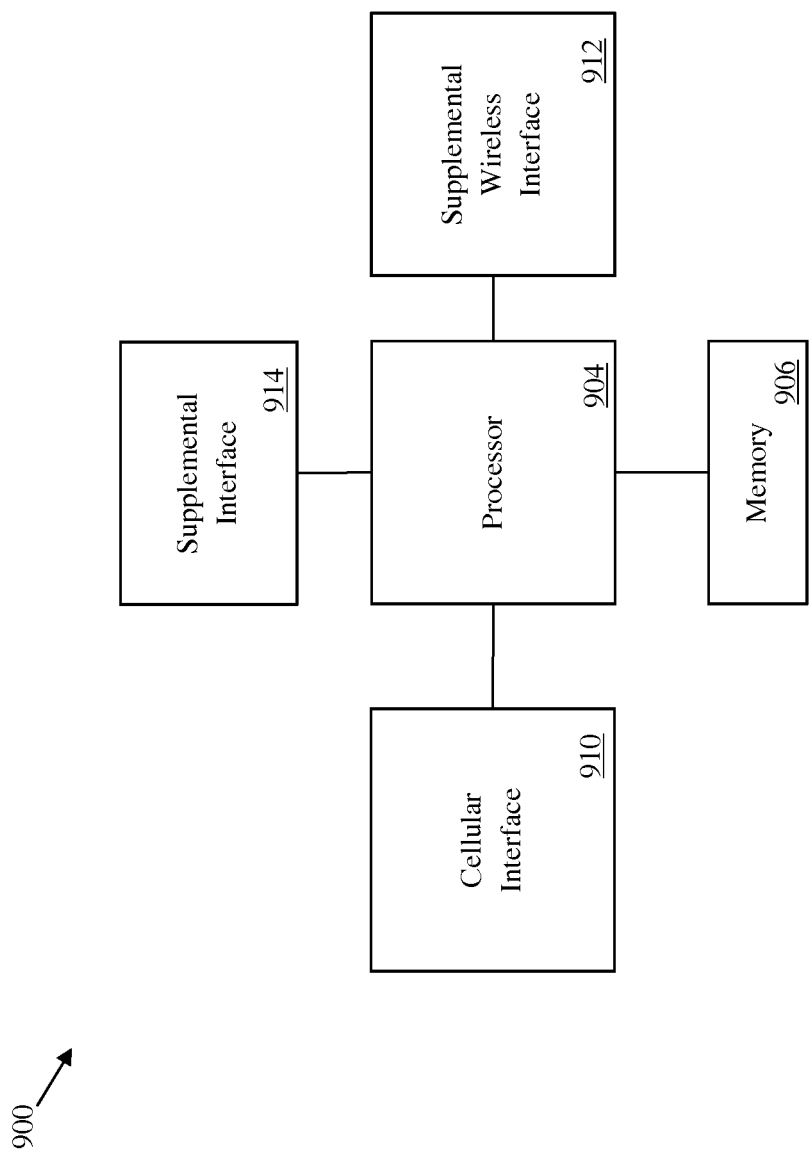

SYSTEMS AND METHODS FOR HISTORICAL SIGNAL INTERFERENCE CANCELLATION (SIC)

TECHNICAL FIELD

The present invention relates generally to wireless communications, and, in particular embodiments, to systems and methods for historical signal interference cancellation (SIC).

BACKGROUND

Modern wireless receivers may be configured to perform signal interference cancellation (SIC) or joint processing to separate serving data from interfering data. When a SIC configured receiver (hereinafter 'SIC receivers') is unable to decode an initial transmission, conventional data recovery techniques rely on communicating/re-transmitting information related to the serving data transmission. For instance, conventional data recovery techniques may re-transmit the serving data or otherwise communicate additional parity information (e.g., forward error correction (FEC) bits) related to the entire serving data via hybrid automatic repeat request (HARQ) signaling. In some instances, re-transmitting the serving data (or FEC bits related thereto) may consume substantial bandwidth, particularly when a mobile station is located at the cell edge or otherwise has poor channel quality (e.g., which may necessitate a low coding rate). As such, more efficient mechanisms for data recovery are desired.

SUMMARY OF THE INVENTION

Technical advantages are generally achieved, by embodiments of the present invention which describe systems and methods for historical interference cancellation.

In accordance with an embodiment, a method for operating a receiver is provided. In this example, the method includes receiving an interference signal comprising a collision between a serving data transmission and an interfering data transmission at a first time-frequency instance, storing the interference signal in memory, and receiving information related to the interfering data transmission during a second time-frequency instance. The method further includes decoding the interference signal stored in memory using the information related to the interfering data transmission in accordance with a SIC or joint processing technique, thereby obtaining data carried by the serving data transmission. An apparatus for performing this method is also provided.

In accordance with another embodiment, another method for operating a receiver is provided. In this example, the method includes receiving an interference signal comprising a collision between a serving data transmission and an interfering data transmission during a first time-frequency instance of a scheduled environment, storing the interference signal in a memory, and receiving an interfering data re-transmission at a second time-frequency instance. The method further includes decoding the interference signal stored in memory using the interfering data re-transmission in accordance with a SIC or joint processing technique to obtain data carried by the serving data transmission. An apparatus for performing this method is also provided.

In accordance with another embodiment, another method for operating a receiver is provided. In this example, the method includes receiving an interference signal comprising a collision between a serving data transmission and an interfering data transmission during a first time-frequency instance of a scheduled environment, storing the interference signal in memory, and receiving a plurality of FEC bits corresponding to the interfering data transmission during a second time-frequency instance. The method further includes decoding the interference signal stored in memory using the FEC bits corresponding to the interfering data transmission in accordance with a SIC or joint processing technique, thereby obtaining data carried by the serving data transmission. An apparatus for performing this method is also provided.

BRIEF DESCRIPTION OF THE DRAWINGS

For a more complete understanding of the present invention, and the advantages thereof, reference is now made to the following descriptions taken in conjunction with the accompanying drawings, in which:

FIG. 9 illustrates a block diagram of an embodiment communications device.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

The making and using of embodiments of this disclosure are discussed in detail below. It should be appreciated, however, that the concepts disclosed herein can be embodied in a wide variety of specific contexts, and that the specific embodiments discussed herein are merely illustrative and do not serve to limit the scope of the claims. Further, it should be understood that various changes, substitutions and alterations can be made herein without departing from the spirit and scope of this disclosure as defined by the appended claims.

Aspects of this disclosure achieve data recovery by communicating information related to interfering data transmission to the SIC receiver following the receiver's unsuccessful attempt to decode a serving data transmission. More specifically, a SIC receiver may store an original interference signal in memory after failing to successfully decode it. The original interference signal may include a collision between a serving data transmission and an interfering data transmission. Thereafter, the SIC receiver may request (passively, actively, or otherwise) for information related to the interfering data transmission. In turn, information related to the interfering data transmission may be sent to the SIC receiver. The information related to the interfering data transmission may include any information related to the interfering data transmission, including (but not limited to) a re-transmission of the interfering data transmission, FEC bits associated with the interfering data transmission, and/or control data associated with the interfering data transmission. The SIC receiver may use the information related to the interfering data transmission to obtain the serving data from the interference signal (stored in memory) in accordance with a SIC or joint processing decoding technique. As discussed herein, SIC and joint processing techniques are used interchangeably unless otherwise specified. Aspects of this disclosure may achieve efficiencies over conventional data recovery techniques when communicating information related to the interfering data transmission consumes fewer network resources (e.g., bandwidth, etc.) than communicating/re-transmitting information related to the serving data transmission.

Figure 1:
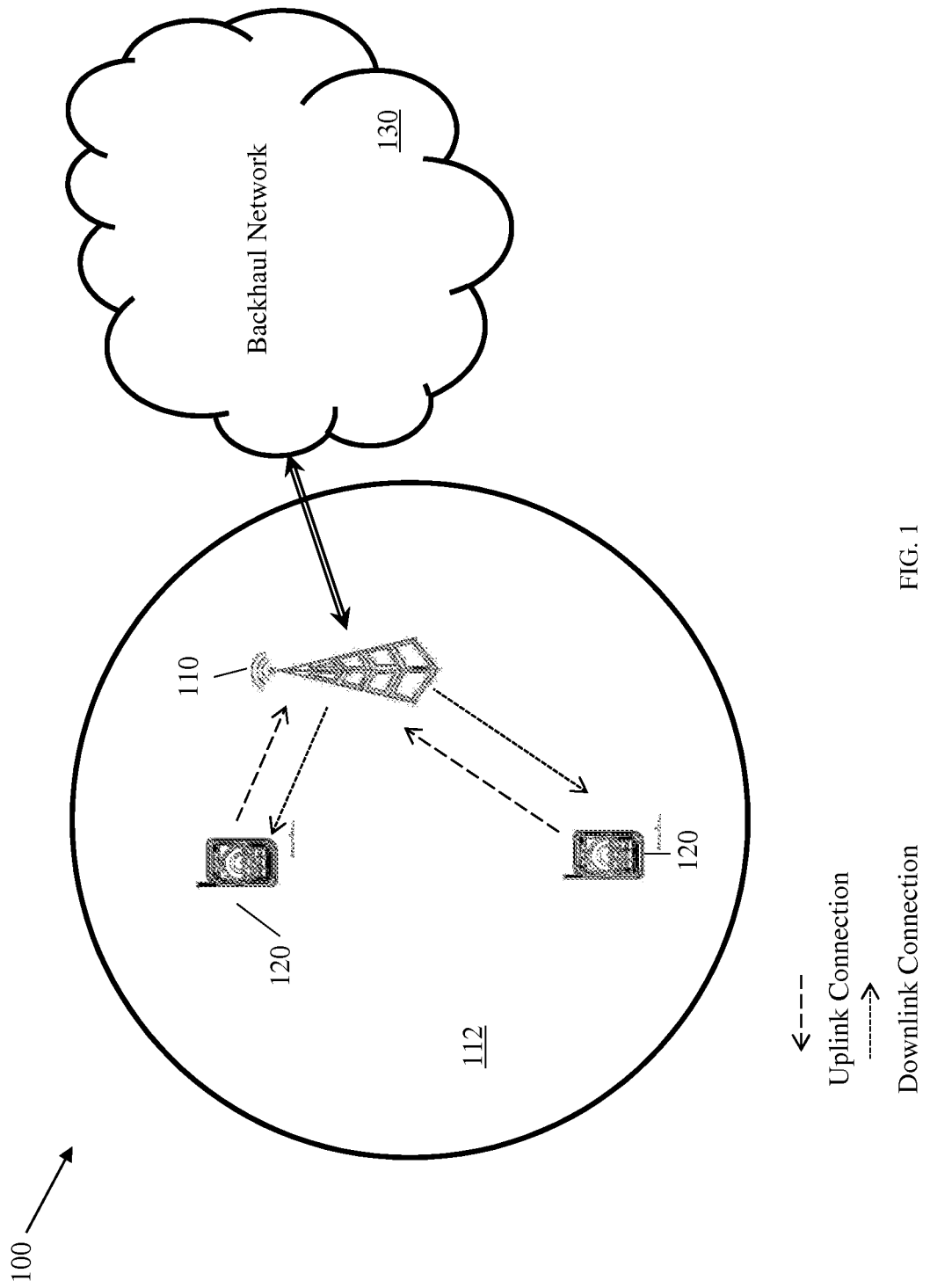
FIG. 1 illustrates diagram of a wireless network for communicating data.

FIG. 1 illustrates a network 100 for communicating data. The network 100 comprises an access point (AP) 110 having a coverage area 112, a plurality of user equipments (UEs) 120, and a backhaul network 130. The AP 110 may comprise any component capable of providing wireless access by, inter alia, establishing uplink (dashed line) and/or downlink (dotted line) connections with the UEs 120-125, such as a base station, an enhanced base station (eNB), a femtocell, and other wirelessly enabled devices. The UEs 120-125 may comprise any component capable of establishing a wireless connection with the AP 110. The backhaul network 130 may be any component or collection of components that allow data to be exchanged between the AP 110 and a remote end (not shown). In some embodiments, the network 100 may comprise various other wireless devices, such as relays, femtocells, etc.

Figure 2:
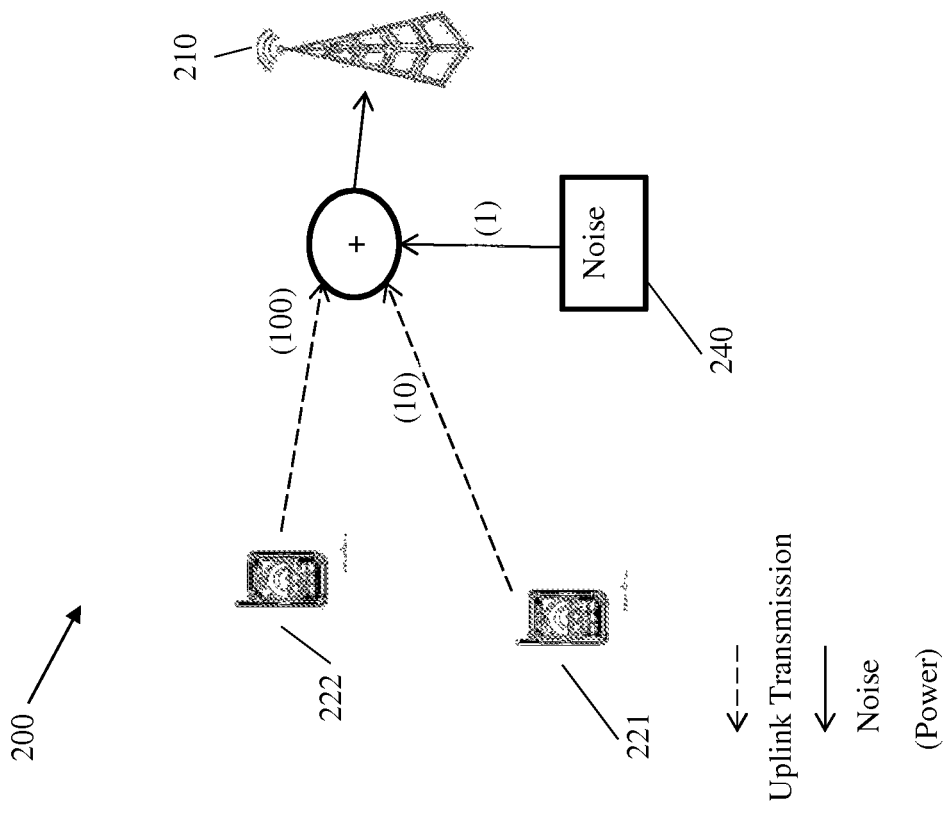
FIG. 2 illustrates a diagram of an embodiment network for communicating data in accordance with historical interference cancellation.

FIG. 2 illustrates a network 200 for communicating data in accordance with a historical interference cancellation technique. The network 200 includes an AP 210 and a pair of UEs 221, 222. In the network 200, the UE 221 communicates an uplink transmission having a power coefficient of ten (10), the UE 222 communicates an uplink transmission having a power coefficient of one hundred (100), and a collection of other interferences (noise+interference) component 240 of a channel may produce noise in the channel having a power coefficient of one (1).

During a first time-frequency instance, the UE 221 transmits a first encoded packet carrying data-1 and the UE 222 transmits a second encoded packet carrying data-2. The transmissions by the UEs 221, 222 experience interference from one another as well as from the IoT component 240. As a result, the AP 210 receives an interference signal in the first time frequency instance that comprises the first encoded packet and the second encoded packet as well as some noise. Upon reception, the AP 210 attempts to decode the first encoded packet and the second encoded packet in accordance with an interference cancellation technique. For example, the AP 210 may attempt to isolate the first encoded packet and/or the second encoded packet from the first interference signal using a SIC technique. However, the AP's 210 attempt to decode the first encoded packet and/or the second encoded packet is unsuccessful.

Conventionally, both the data-2 and the data-1 would be retransmitted across the network. However, because the AP 210 is configured for historical decoding, only the data-2 is retransmitted across the network 200. Specifically, the AP 210 stores the interference signal in a memory, and requests retransmission of the data-2 without requesting retransmission of the data-1. In some embodiments, the AP 210 may request information for decoding the data-2 (e.g., forward error correction (FEC) bits, etc.), rather than requesting a retransmission of the data-2. In one embodiment, the decision to request re-transmission of the data-2 instead of data-1 may be based on a UE ordering (e.g., the order in which signals are decoded during interference cancellation). Alternatively, the decision to request retransmission of the data-2 instead of data-1 may be made when it is more efficient (or otherwise preferable) to retransmit the data-2. This efficiency may be related to one or more parameters, including spectral efficiency (i.e., minimum number of time-frequency resources required to retransmit the data), power constraints (e.g., battery power, etc.), interference produced in the network (e.g., inter-cell-interference (ICI) generated in neighboring cells, etc.) and others.

Notably, the time frequency resources used to carry the first and second encoded packets may exist on different carrier signals having carrier frequencies. Further, the first and second encoded packets may (in some embodiments) be transmitted using different protocols or communication schemes or even over different mediums, e.g., the second encoded packet could be transmitted over wire-line or using infrared communication, etc.).

Thereafter, a third data packet carrying the data-2 (or FEC bits related to the data-2) is received by the AP 210 at a second time-frequency instance. The third data packet may be sent by the UE 222 or by another entity (e.g., a relay, another receiver, etc.). In some embodiments, a fourth data packet carrying a data-3 (i.e., data that is different than the data-1) may also be received during the second time-frequency instance. The fourth data packet may be transmitted by the UE 221 or another entity (not shown). However, neither the data-1 nor FEC bits related to the data-1 are received by the AP 210 after the first time-frequency instance. Instead, the AP 210 obtains the data-1 from the first interference signal stored in memory using information received at the second time-frequency instance (T2).

In embodiments where the third encoded packet carries the data-2, the AP 210 at least partially decodes the third encoded packet to obtain at least a portion of the data-2. In embodiments where the third encoded packet carries FEC bits related to the data-2, the AP 210 uses the FEC bits to at least partially decode the second encoded packet to obtain at least a portion of the data-2. Once obtained, the portion of data-2 is used to isolate the data-1 from the first interference signal stored in memory using an interference cancellation technique. As used herein, interference cancellation techniques include any scheme that allows for improved reception in the presence of an interference signal having known statistics, including (but not limited to) turbo or soft SIC, hard SIC, maximum likelihood (ML) receivers and approximations thereof, joint reception schemes (e.g., message passing algorithms, etc.), and others.

Figure 3:
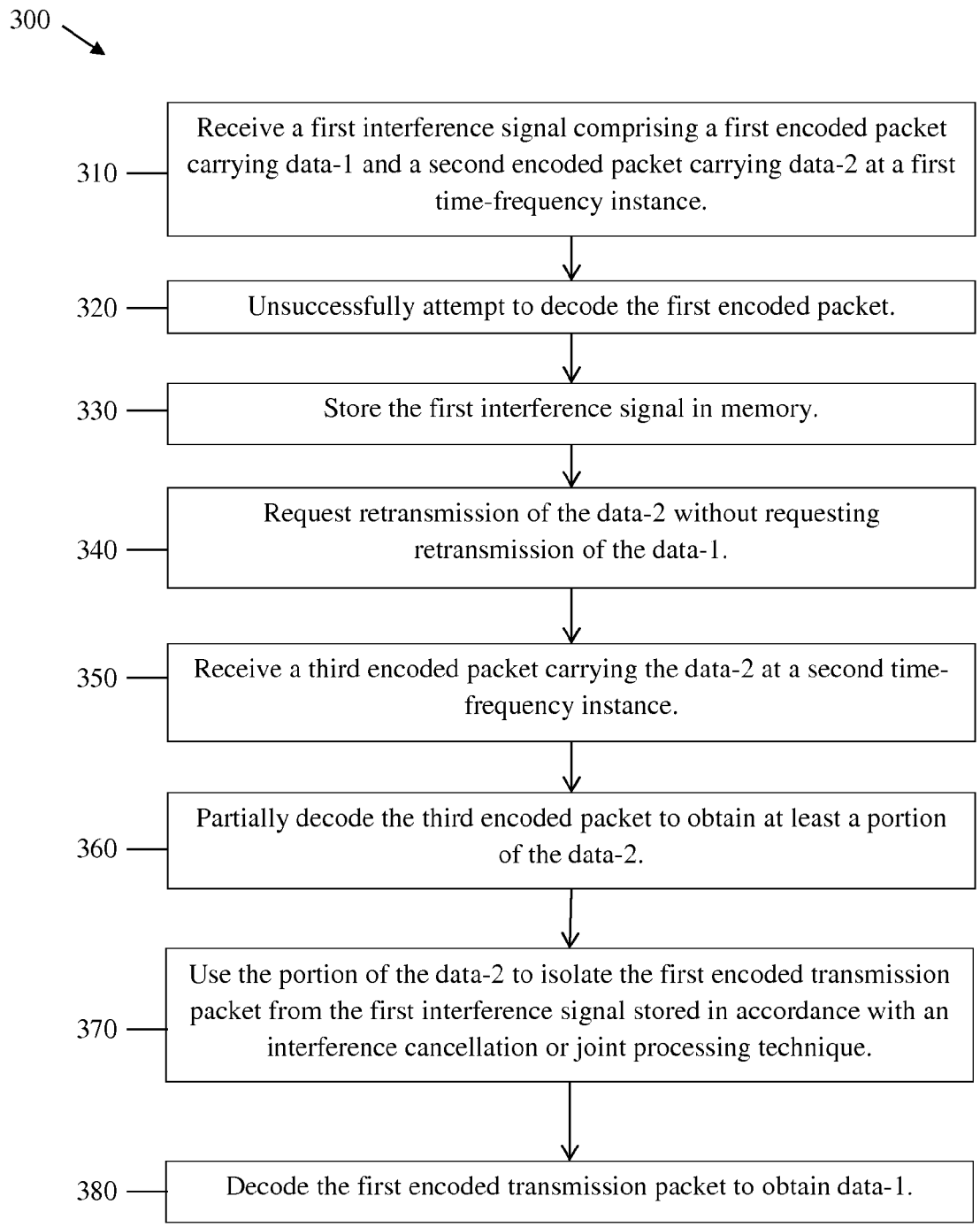
FIG. 3 illustrates a flowchart of a method for decoding data in accordance with historical interference cancellation.

FIG. 3 illustrates a method 300 for decoding data in accordance with a historical interference cancellation technique, as may be performed by a receiver. The method 300 begins at step 310, where the receiver receives a first interference signal comprising both a first encoded packet and a second encoded packet. The first encoded packet carries a data-1, and the second encoded packet carries a data-2. Next, the method 300 proceeds to step 320, where the receiver unsuccessfully attempts to decode the first encoded packet. Thereafter, the method 300 proceeds to step 330, where the receiver stores the first interference signal in memory. Subsequently, the method 300 proceeds to step 340, where the receiver requests retransmission of the data-2 without requesting retransmission of the data-1. Next, the method 300 proceeds to step 350, where the receiver receives a third encoded packet carrying the data-2 at a second time-frequency instance. In some embodiments, the second encoded packet and the third encoded packet are substantially identical, except for signaling information (e.g., data IDs, etc.). In other embodiments, the third encoded packet is transmitted at a lower coding rate than the second encoded packet, and consequently carries more parity information. Next, the method 300 proceeds to step 360, where the receiver at least partially decodes the third encoded packet to obtain at least a portion of the data-2. Thereafter, the method 300 proceeds to step 370, where the receiver uses the portion of the data-2 to isolate the first encoded packet from the first interference signal stored in the memory in accordance with an interference cancellation technique (e.g., SIC or otherwise). Finally, the method 300 proceeds to step 380, where the receiver decodes the first encoded packet to obtain the data-1.

In the method 300, the first interference signal ($y_1$) and the second interference signal ($y_2$) may be represented as: $y_1 = H_1 x_1 + H_2 x_2$ and $y_2 = H_2' x_2' + H_3 x_3$, where $x_1$ is the first encoded packet carrying the data-1, $x_2$ is the second encoded packet carrying the data-2, $x_2'$ is the third encoded packet carrying the data-2, $x_3$ is the fourth encoded packet carrying the data-3 (optional), and $H_1, H_2, H_2', H_3$ are transfer function coefficients for the air channels carrying $x_1, x_2, x_2', x_3$ (respectively). The receiver decodes $x_2'$ to obtain a portion of the data-2. The portion of the data-2 is then used to isolate $x_1$ from $y_1$ (stored in memory) in accordance with an interference cancellation technique. Thereafter, the receiver decodes $x_1$ to obtain the data-1.

Figure 4:
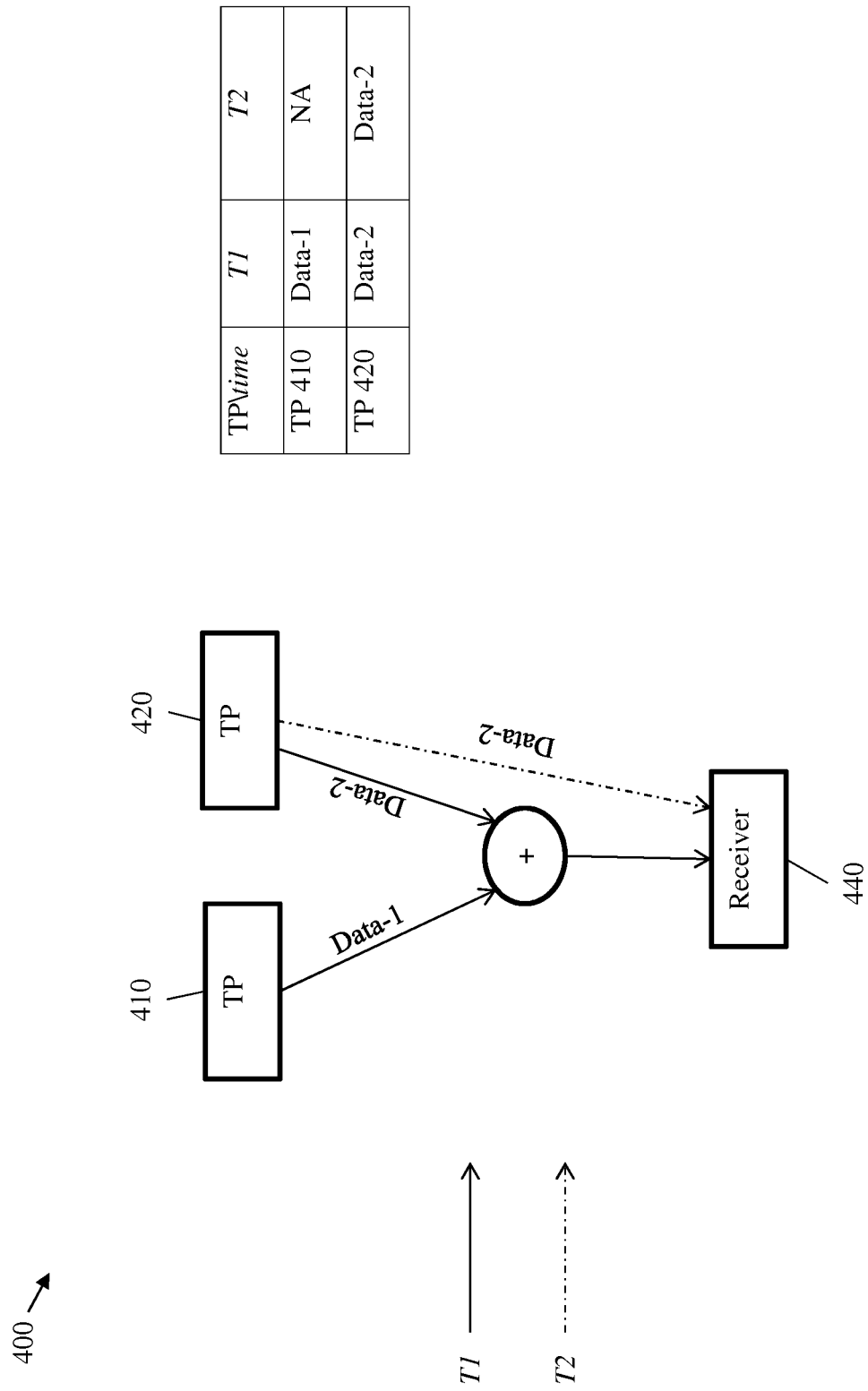
FIG. 4 illustrates a diagram of another embodiment network for communicating data in accordance with historical interference cancellation.

FIG. 4 illustrates a network 400 for communicating data in accordance with a historical interference cancellation technique, as may be implemented between two transmit points (TPs) 410, 420 and a receiver 440. As discussed herein, the term transmit point (TP) may refer to any device used to transmit a wireless signal to a receiver, including base stations, relays, user equipments, and other devices capable of wireless transmission. The term receiver may refer to any device capable of receiving wireless signals, including base stations, relays, user equipments, and other devices capable of wireless reception. For instance, in some embodiments, one or more of the TPs 410, 420 and the receiver 440 may be peer mobile devices engaged in a device-to-device (D2D) communication.

At a first time-frequency instance, the receiver 440 receives a first interference signal comprising a first encoded packet (carrying data-1 transmitted by the TP 410) and a second encoded packet (carrying data-2 transmitted by the TP 420). The data-1 is destined/intended for the receiver 440, and consequently the receiver 440 is configured to decode the first encoded packet to obtain the data-1. In some embodiments, the data-2 is also destined/intended for the receiver 440 such that the receiver 440 is configured to attempt to decode the second encoded packet to obtain the data-2. In other embodiments, the data-2 is destined for another device (e.g., another receiver), and hence the receiver 440 may be configured to decode the second encoded packet only to the degree necessary or useful in isolating the first encoded packet from the first interference signal, e.g., in accordance with an interference cancellation technique.

In any event, the receiver 440 is unable to decode the first encoded packet. Conventionally, the receiver 440 would request retransmission of data-1 upon failing to decode the first encoded packet carrying data-1. However, the receiver 440 is configured for historical decoding, and (as a result) does not request retransmission of the first encoded packet. Instead, the receiver 440 stores the first interference signal in memory, and requests a retransmission of data-2 without requesting retransmission of data-1. In response to this request, the TP 420 sends a third encoded packet carrying the data-2 at a second time-frequency instance. Accordingly, the receiver 440 receives a second interference signal carrying the third encoded packet. The second interference signal may potentially carry other data (e.g., data-3, etc.). As used herein, the term interference signal may refer to any signal, including signals that do not result from the collision of multiple data transmissions. Upon reception, the receiver 440 at least partially decodes the third encoded packet to obtain at least a portion of data-2. The receiver 440 then uses the portion of data-2 to isolate the first encoded packet from the first interference signal stored in the memory. The receiver 440 thereafter proceeds to decode the isolated first encoded packet and obtain the data-1.

Figure 5:
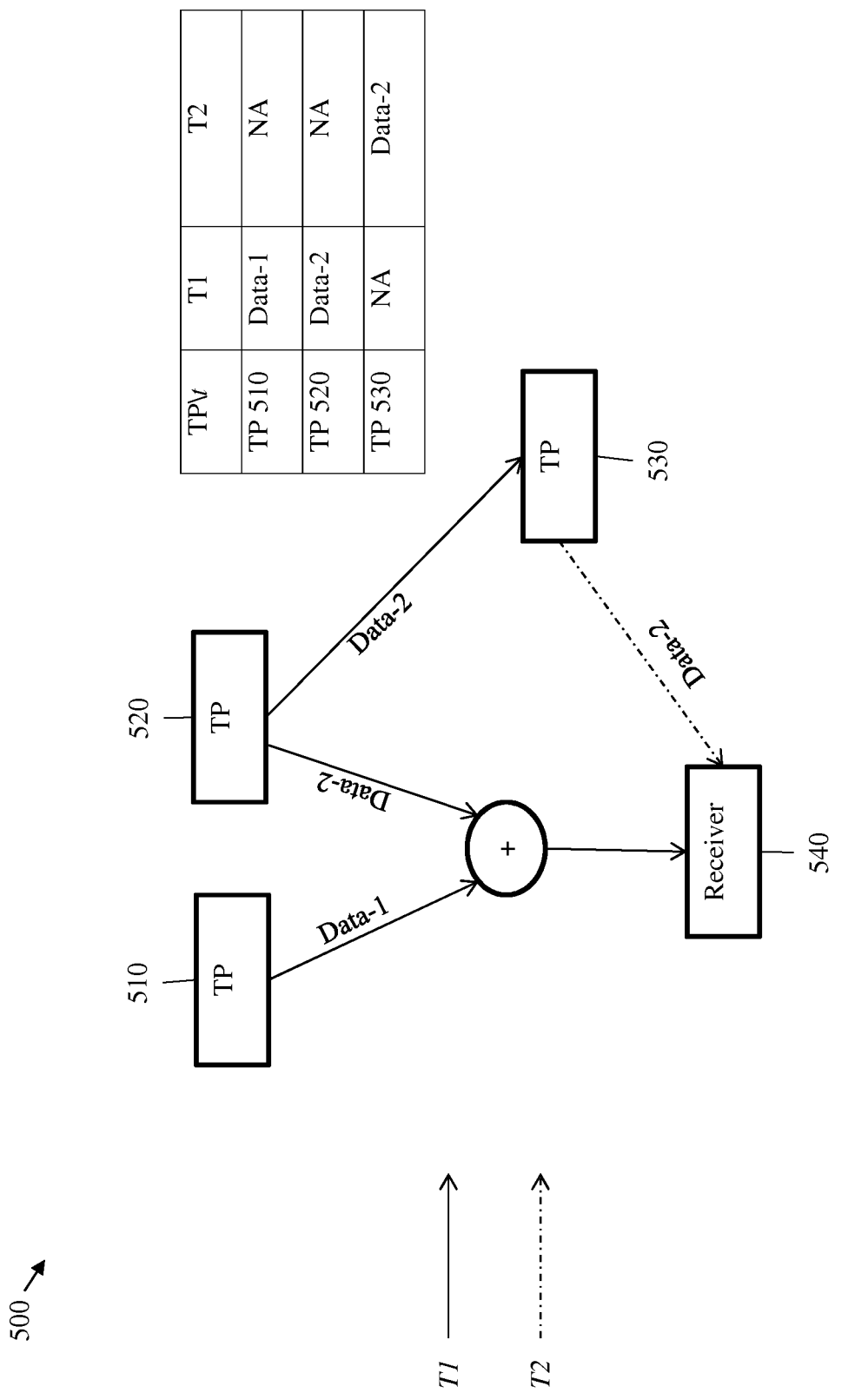
FIG. 5 illustrates a diagram of yet another embodiment network for communicating data in accordance with historical interference cancellation.

FIG. 5 illustrates a network 500 for communicating data in accordance with a historical interference cancellation technique, as may be implemented between the TPs 510-530 and a receiver 540. The network 500 is similar to the network 400, with the exception that the data-2 is retransmitted by the TP 530 at T2, rather than by the TP 520 that originally transmitted the data-2 T1. In an embodiment, the TP 530 may be a base station, a UE, a relay, or any other device that is capable of retransmitting the data-2 to the receiver 540.

Specifically, the receiver 540 receives a first interference signal comprising a first encoded packet (carrying data-1 transmitted by the TP 510) and a second encoded packet (carrying data-2 transmitted by the TP 520) at a first time-frequency instance. The data-1 is destined for the receiver 540, while the data-2 may or may not be destined for the receiver 540. For instance, in some embodiments the data-2 is destined for the TP 530. The receiver 540 unsuccessfully attempts to decode the first encoded packet communicated in the first interference signal. Thereafter, the receiver 540 stores the first interference signal in a memory, and requests a retransmission of the data-2 without requesting retransmission of the data-1. The TP 530 sends a third encoded packet carrying the data-2 at a second time-frequency instance. The receiver 540 partially decodes the third encoded packet to obtain at least a portion of the data-2, which the receiver 540 uses to isolate the first encoded packet from the first interference signal stored in the memory. The receiver 540 thereafter proceeds to decode the first encoded packet and obtain the data-1.

Figure 6:
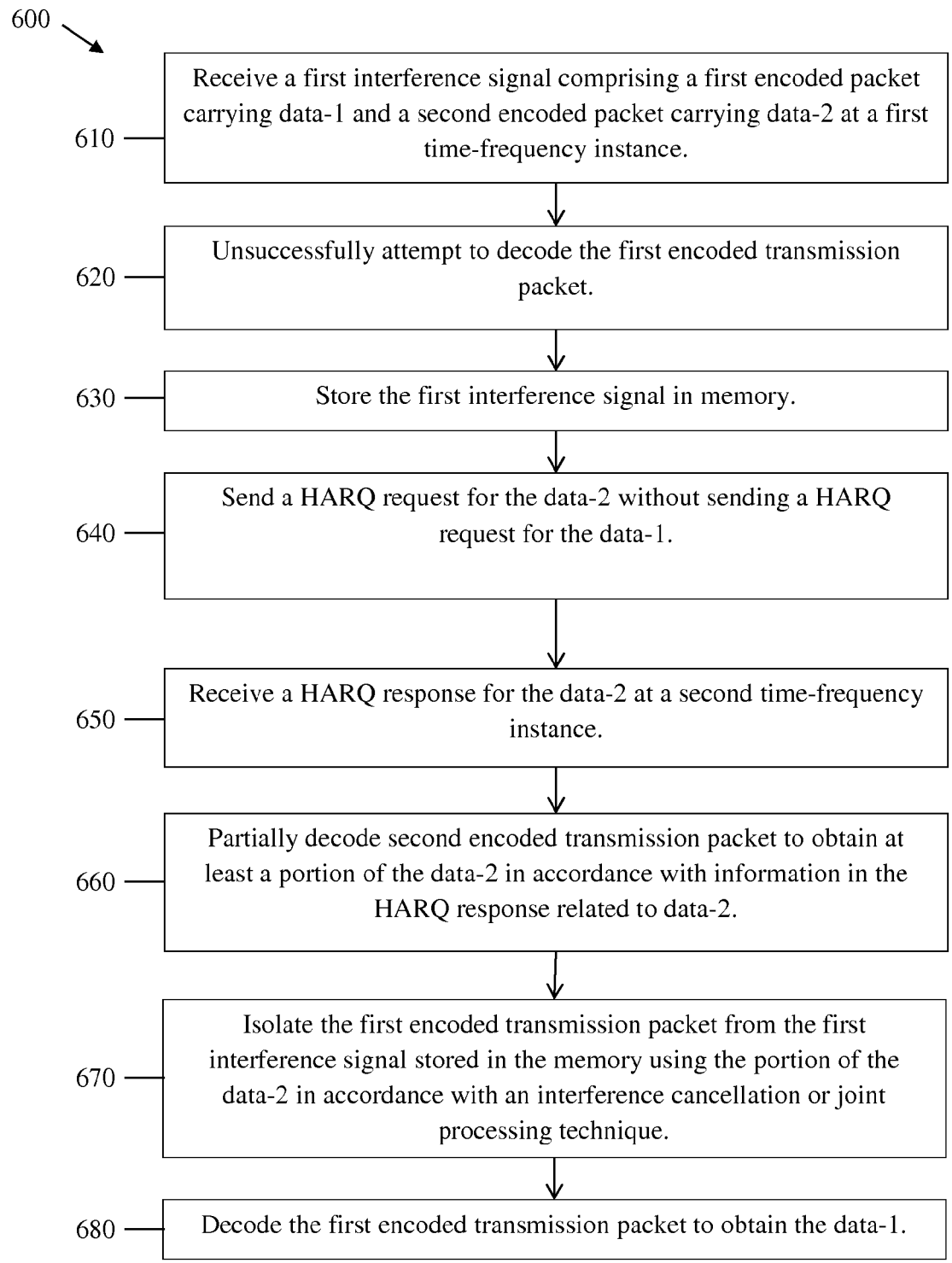
FIG. 6 illustrates a flowchart of another method for decoding data in accordance with historical interference cancellation.

FIG. 6 illustrates a method 600 for decoding data in accordance with a historical interference cancellation technique, as may be performed by a receiver. The method 600 is similar in many respects to the method 300, with the exception that the method 600 communicates FEC bits related to the data-2 at the second time-frequency instance, rather than retransmitting all of the information bits of the data-2. Notably, the FEC bits communicated at second time-frequency instance may comprise information bits and parity bits related to the data-2. In an embodiment, the FEC bits communicated at second time-frequency instance may comprise fewer than all of the information bits related to the data-2.

Specifically, the method 600 begins at step 610, where the receiver receives a first interference signal comprising a first encoded packet and a second encoded packet. The first encoded packet carries data-1, and the second encoded packet carries data-2. Next, the method 600 proceeds to step 620, where the receiver unsuccessfully attempts to decode the first encoded packet. Thereafter, the method 600 proceeds to step 630, where the receiver stores the first interference signal in memory. Subsequently, the method 600 proceeds to step 640, where the receiver sends a request for FEC bits associated with the data-2 without sending a similar request for the data-1. In embodiments, the request may be a hybrid automatic repeat request (HARQ) request.

Next, the method 600 proceeds to step 650, where the receiver receives a response carrying FEC bits related to the data-2. The FEC bits may include parity bits and information bits corresponding to the data-2. Thereafter, the method 600 proceeds to step 660, where the receiver uses information communicated by the FEC bits to at least partially decode the second encoded packet from the first interference signal stored in memory and obtain at least a portion of the data-2. Subsequently, the method 600 proceeds to step 670, where the receiver uses the portion of the data-2 to isolate the first encoded packet from the first interference signal stored in the memory in accordance with an interference cancellation technique (e.g., SIC or otherwise). Finally, the method 600 proceeds to step 680, where the receiver decodes the first encoded packet to obtain the data-1.

In the method 600, the first interference signal ($y_1$) and the second interference signal ($y_2$) may be represented as: $y_1 = H_1 x_1 + H_2 x_2$ and $y_2 = H_2' x_2' + H_3 x_3$, where $x_1$ is the first encoded packet carrying the data-1, $x_2$ is the second encoded packet carrying the data-2, $x_2'$ is the third encoded packet carrying FEC bits corresponding to the data-2, $x_3$ is the fourth encoded packet carrying the data-3 (optional), and $H_1$, $H_2$, $H_2'$, $H_3$ are transfer function coefficients for the air channels carrying $x_1$, $x_2$, $x_2'$, $x_3$ (respectively). The receiver decodes $x_2'$ to obtain the FEC bits related to the data-2, and then uses those FEC bits to at least partially decode x2 to obtain at a portion of the data-2. The portion of the data-2 is then used to isolate $x_1$ from $y_1$ (stored in memory) in accordance with an interference cancellation technique. Thereafter, the receiver decodes $x_1$ to obtain the data-1.

One or more of the embodiments of the method 600 may require a first receiver (an interfered receiver) to send a HARQ request for data (e.g., the data-2) that was intended/destined for a second receiver (an intended receiver). Notably, an acknowledgment (ACK)/negative-acknowledgment (NACK) channel that would typically be used by the intended receiver to make HARQ requests for the data-2 may be inaccessible to the interfered receiver. As such, alternative mechanisms for allowing the interfered receiver to make HARQ request for the data-2 are needed.

One mechanism that interfered receivers may use to send HARQ request for interfering data (i.e., data intended for the interfered receiver) may include overriding a feedback or ACK/NACK channel of the intended receiver. In some embodiments, a sequential system may be established, where the intended receiver is given a first opportunity to send a HARQ request for the data, and thereafter (if the intended receiver passes) one or more interfering receivers are given opportunities to override the ACK/NACK channel to send a HARQ request for interfering data.

Another mechanism that interfered receivers may use to send HARQ request for interfering data may include adding additional slots into the interfering receiver's ACK/NACK channel that allow the interfering receiver to send HARQ requests for interfering data (e.g., data not destined for the first receiver). In such embodiments, the interfering receiver may need to identify the interfering data in the HARQ request. One technique for identifying the interfering data in the HARQ request may be to reference an index identifier (ID) or data ID associated with the interfering data. The index/data ID may be a number between one and N (N is an integer) that identifies a given piece of data for a specific time-frequency instance. To wit, data-1 and data-2 would have different index/data IDs when transmitted during the same time-frequency instance. The index/data IDs may be reused for different time-frequency instances, thereby reducing the singling (e.g., bits) associated with the index/data ID, and a new data indicator may be used to distinguish initial transmission from retransmissions. Another technique may be to rely on secondary statistics (e.g., transport block size, higher layer parameters, etc.) to distinguish between different unique data points. For instance, the HARQ request may identify the interfering data by specifying one or more of a resource block (RB) or resource element (RE) carrying the interfering data, a cell identifier corresponding to the interfering data, a transmission layer or demodulation reference signal (DMRS) corresponding to the interfering data. Blind detection of differences may also be used, for instance, if cyclic redundancy check (CRC) checks out, but the data is different. The HARQ request may identify the interfering data by referencing an origination point of the interfering data. Depending on the air interface, the origination point may be referenced by one or a combination of an instance in time, a frequency, a transmitter ID, a spreading sequence, a base station ID, a DMRS, user ID, and other parameters or information associated with the interfering data.

Figure 7:
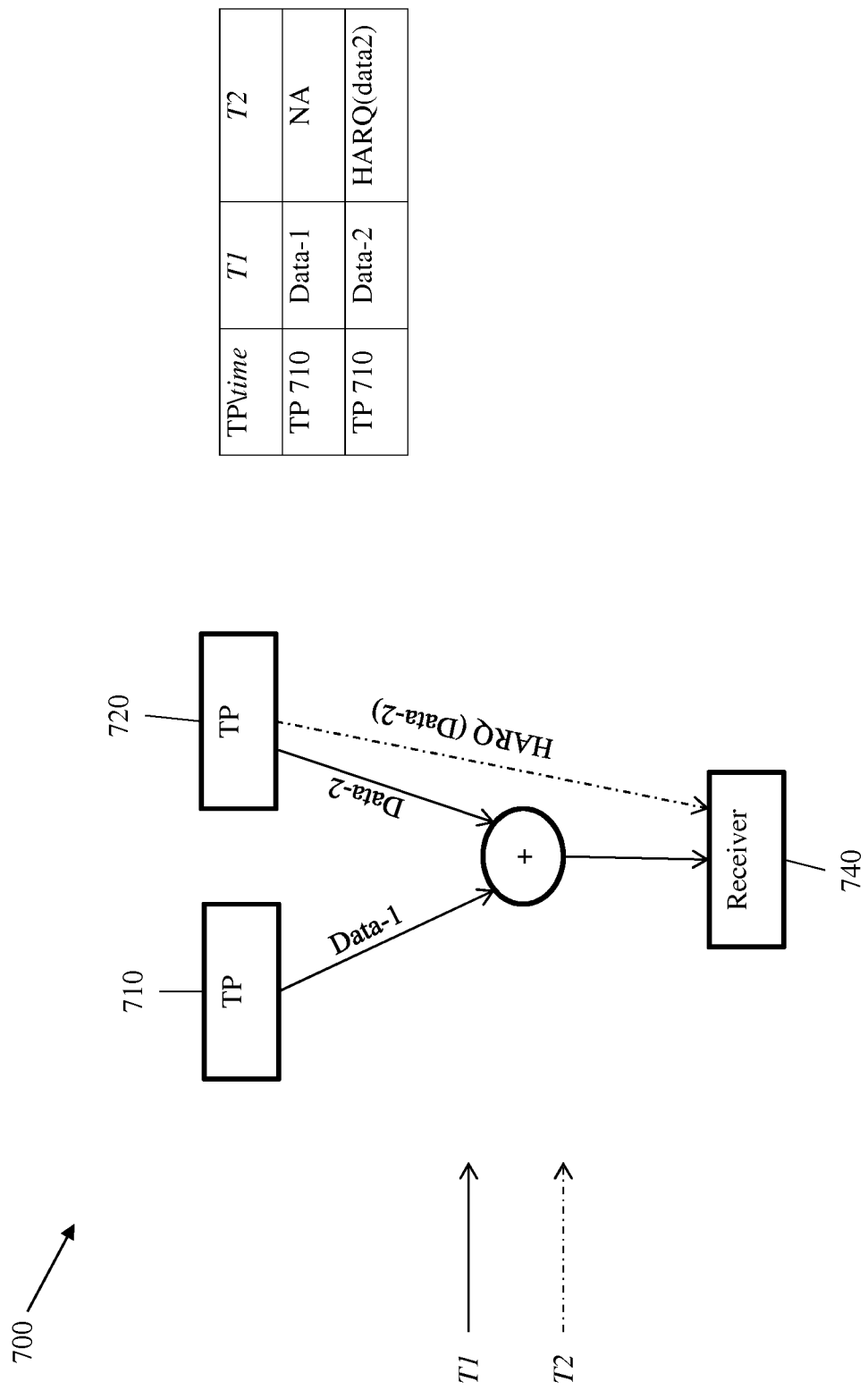
FIG. 7 illustrates a diagram of yet another embodiment network for communicating data in accordance with historical interference cancellation.

FIG. 7 illustrates a network 700 for communicating data in accordance with a historical interference cancellation technique, as may be implemented between TPs 710-720 and a receiver 740. The network 700 is similar to the network 400, with the exception that FEC bits of an earlier data transmission are communicated in lieu of retransmitting the earlier data transmission. The FEC bits may include parity information related to the earlier data transmission.

Specifically, the receiver 740 receives a first interference signal comprising a first encoded packet (carrying data-1 transmitted by the TP 710) and a second encoded packet (carrying data-2 transmitted by the TP 720) at a first time-frequency instance. The data-1 is destined for the receiver 740, while the data-2 may or may not be destined for the receiver 740. The receiver 740 unsuccessfully attempts to decode the first encoded packet. Thereafter, the receiver 740 stores the first interference signal in memory, and sends a request for FEC bits related to the data-2. Upon receiving the request, the TP 720 sends a response carrying FEC bits of the data-2 (HARQ(Data-2)) at a second time-frequency instance. Notably, the HARQ(Data-2) message can be any message that carries FEC bits related to an earlier transmission of the data-2. Upon reception, the receiver 740 uses the FEC bits carried by the HARQ(Data-2) to at least partially decode the second encoded packet and obtain at least a portion of data-2. The receiver 740 uses the portion of data-2 to isolate the first encoded packet from the first interference signal stored in the memory. The receiver 740 thereafter proceeds to decode the first encoded packet and obtain the data-1.

Figure 8:
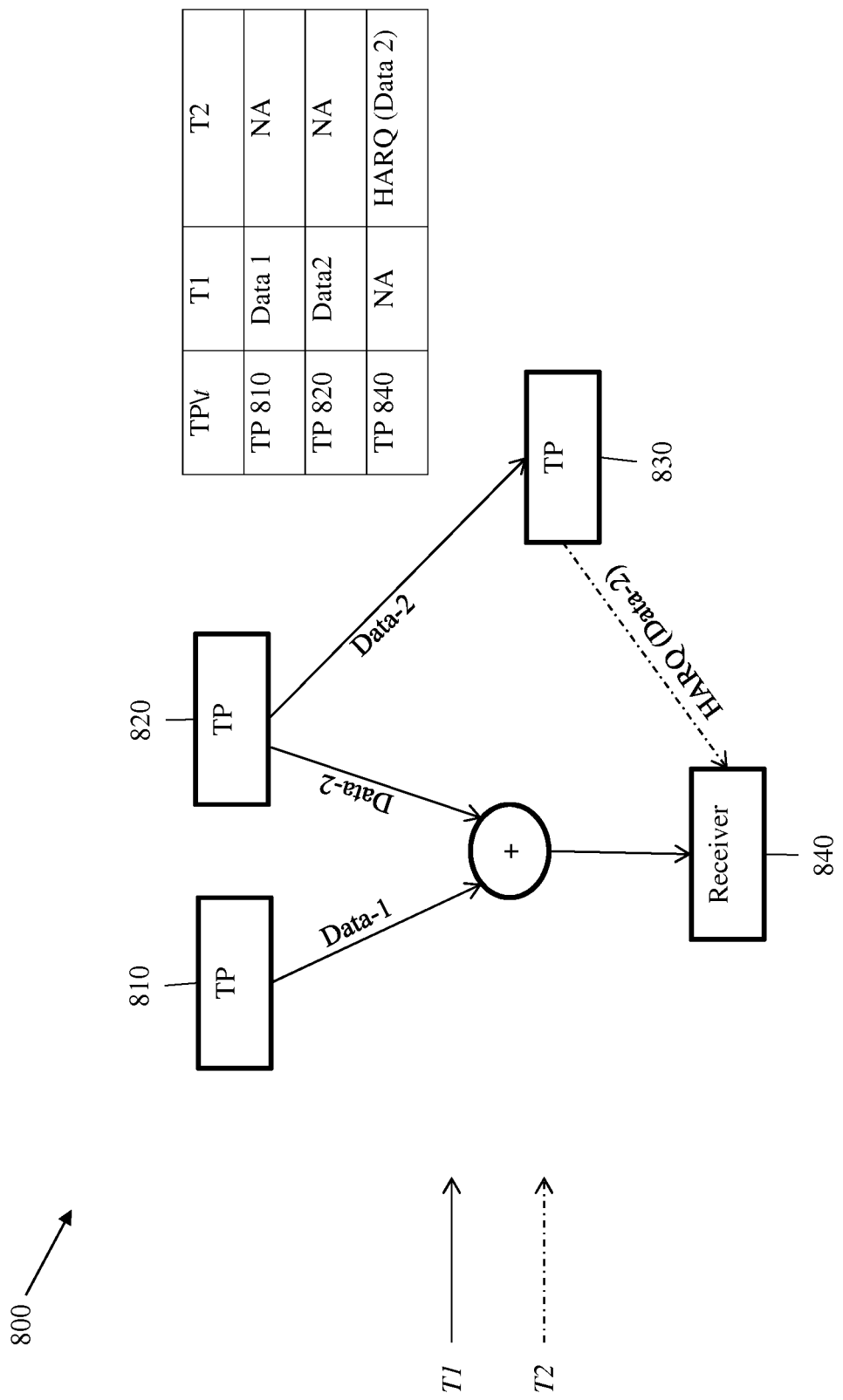
FIG. 8 illustrates a diagram of yet another embodiment network for communicating data in accordance with historical interference cancellation.

FIG. 8 illustrates a network 800 for communicating data in accordance with a historical interference cancellation technique, as may be implemented between the TPs 810-830 and a receiver 840. The network 800 is similar to the network 700, with the exception that the HARQ(data-2) is communicated by the TP 830, rather than the TP 820 that originally transmitted the data-2. In an embodiment, the TP 830 may be a base station, a UE, a relay, or any other device that is capable of providing the HARQ(data-2) to the receiver 840.

Specifically, the receiver 840 receives a first interference signal comprising a first encoded packet (carrying data-1 transmitted by the TP 810) and a second encoded packet (carrying data-2 transmitted by the TP 820) at a first time-frequency instance. The data-1 is destined for the receiver 840, while the data-2 may or may not be destined for the receiver 840. For instance, in some embodiments the data-2 is destined for the TP 830. The receiver 840 unsuccessfully attempts to decode the first encoded packet communicated in the first interference signal. In some embodiments, the receiver 840 is also unsuccessful in decoding the second encoded packet. Thereafter, the receiver 840 stores the first interference signal in a memory, and sends a HARQ request for the data-2 without sending a HARQ request for the data-1. The TP 830 sends the HARQ (Data-2) at a second time-frequency instance. The receiver 840 obtains at least a portion of the data-2 by using the information in the HARQ (Data-2) to at least partially decode the second encoded packet. The receiver 840 then uses the portion of the data-2 to isolate the first encoded packet from the first interference signal stored in the memory in accordance with an interference cancellation technique. The receiver 840 thereafter proceeds to decode the first encoded packet and obtain the data-1.

Aspects of this disclosure described above in FIGS. 3-8 may be applied in a variety of configurations. For example, the data communication may occur in an uplink channel of a cellular network, where the receiver is a base station, eNB, or some other network component configured for uplink reception and where at least one of the transmitters is a UE, mobile device, or some other device configured for uplink transmission. As another example, the data communication may occur in a downlink channel of a cellular network, where the receiver is a UE, mobile device, or some other device configured for downlink reception, and where at least one of the transmitters is a base station, eNB, or some other network component configured for downlink reception. As another example, the data communication may occur over a device-to-device (D2D) link, where the receiver and at least one of the transmitters are peer mobile devices. Other configurations are also possible.

FIG. 9 illustrates a block diagram of an embodiment of a communications device 900, which may be equivalent to one or more devices (e.g., UEs, NBs, etc.) discussed above. The communications device 900 may include a processor 904, a memory 906, a cellular interface 910, a supplemental wireless interface 912, and a supplemental interface 914, which may (or may not) be arranged as shown in FIG. 9. The processor 904 may be any component capable of performing computations and/or other processing related tasks, and the memory 906 may be any component capable of storing programming and/or instructions for the processor 904. The cellular interface 910 may be any component or collection of components that allows the communications device 900 to communicate using a cellular signal, and may be used to receive and/or transmit information over a cellular connection of a cellular network. The supplemental wireless interface 912 may be any component or collection of components that allows the communications device 900 to communicate via a non-cellular wireless protocol, such as a Wi-Fi or Bluetooth protocol, or a control protocol. The device 900 may use the cellular interface 910 and/or the supplemental wireless interface 912 to communicate with any wirelessly enabled component, e.g., a base station, relay, mobile device, etc. The supplemental interface 914 may be any component or collection of components that allows the communications device 900 to communicate via a supplemental protocol, including wire-line protocols. In embodiments, the supplemental interface 914 may allow the device 900 to communicate with another component, such as a backhaul network component.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed:

1. A method comprising:
    sending, by a base station, a serving data transmission to a user equipment (UE) at a first time-frequency instance of a scheduled environment;
    receiving, by the base station, a request from the UE for information related to an interfering data transmission, wherein the serving data transmission sent by the base station collided with an interfering data transmission during the first time-frequency instance, creating an interference signal, the interfering data transmission and the serving data transmission originating from different transmit points, and the interfering data transmission being intended for a different receiving device than the serving data transmission; and
    sending during a second time-frequency instance, by the base station in response to the request, information related to the interfering data transmission, wherein the interference signal is decoded by the UE using the information related to the interfering data transmission to obtain data carried by the serving data transmission.

2. The method of claim 1, wherein the UE performs signal interference cancellation (SIC) or joint processing on the interference signal stored in memory using the information related to the interfering data transmission.

3. The method of claim 1, wherein the information related to the interfering data transmission comprises information bits carried by the interfering data transmission.

4. The method of claim 1, wherein the information related to the interfering data transmission comprises forward error correction (FEC) bits related to the interfering data transmission.

5. The method of claim 4, wherein the UE performs signal interference cancellation (SIC) or joint processing on the interference signal stored in memory using the FEC bits corresponding to the interfering data transmission.

6. The method of claim 4, wherein the UE obtains the data carried by the serving data transmission without receiving additional FEC bits relating to the serving data transmission after receiving the interference signal at the first time-frequency instance.

7. The method of claim 4, wherein the FEC bits corresponding to the interfering data transmission are carried in a hybrid automatic repeat request (HARQ) response.

8. The method of claim 7, wherein the request for the information related to the interfering data transmission comprises a HARQ request that identifies the interfering data transmission.

9. The method of claim 8, wherein the HARQ request identifies the interfering data transmission by indicating an origination point of the interfering data transmission.

10. The method of claim 9, wherein the HARQ request identifies the origination point of the interfering data transmission by specifying a data identifier (ID) index of a unique wireless data point associated with the origination point of the interfering data transmission.

11. The method of claim 9, wherein the HARQ request indicates the origination point of the interfering data transmission by specifying a resource block (RB) or resource element (RE) carrying the interfering data transmission, a cell identifier of the interfering data transmission, and a transmission layer or demodulation reference signal (DMRS) of the interfering data transmission.

12. The method of claim 7, wherein the HARQ request identifies the interfering data transmission by specifying a packet identifier (ID) of the interfering data transmission.

13. The method of claim 1, wherein the information related to the interfering data transmission comprises control information carried by the interfering data transmission.

14. The method of claim 1, wherein the interfering data transmission is transmitted by a neighboring base station.

15. The method of claim 1, wherein the serving data transmission and the information related to the interfering data transmission are transmitted using one or more of different transmission protocols, different communication schemes, or different transmission mediums.

16. The method of claim 1, wherein the information related to the interfering data transmission includes at least some of the data carried in the interfering data transmission.

17. A base station, comprising:
a processor; and
a non-transitory computer readable storage medium storing programming for execution by the processor, the programming including instructions to:
send a serving data transmission to a user equipment (UE) at a first time-frequency instance of a scheduled environment;
receive a request from the UE for information related to an interfering data transmission, wherein the serving data transmission sent by the base station collided with an interfering data transmission during the first time-frequency instance, creating an interference signal, the interfering data transmission and the serving data transmission originating from different transmit points, and the interfering data transmission being intended for a different receiving device than the serving data transmission; and
send, during a second time-frequency instance and in response to the request, information related to the interfering data transmission, wherein the serving data transmission is decoded by the UE using the information related to the interfering data transmission to obtain data carried by the serving data transmission.

18. A method comprising:
receiving, by a user equipment (UE), an interference signal comprising a collision between a serving data transmission and an interfering data transmission at a first time-frequency instance of a scheduled environment, wherein the serving data transmission is transmitted from a base station to the UE, the interfering data transmission and the serving data transmission originating from different transmit points, and the interfering data transmission being intended for a different receiving device than the serving data transmission;
storing, by the UE, the interference signal in memory;
requesting, by the UE, information related to the interfering data transmission;
receiving, by the UE, the information related to the interfering data transmission in response to the request during a second time-frequency instance; and
decoding, by the UE, the interference signal stored in memory using the information related to the interfering data transmission to obtain data carried by the serving data transmission.

19. The method of claim 18, wherein decoding the interference signal stored in memory comprises:
performing signal interference cancellation (SIC) or joint processing on the interference signal stored in memory using the information related to the interfering data transmission.

20. The method of claim 18, wherein the information related to the interfering data transmission comprises information bits carried by the interfering data transmission.

21. The method of claim 18, wherein the information related to the interfering data transmission comprises forward error correction (FEC) bits related to the interfering data transmission.

22. The method of claim 21, wherein decoding the interference signal stored in memory comprises:
performing signal interference cancellation (SIC) or joint processing on the interference signal stored in memory using the FEC bits corresponding to the interfering data transmission.

23. The method of claim 22, wherein the UE obtains the data carried by the serving data transmission without receiving additional FEC bits relating to the serving data transmission after receiving the interference signal at the first time-frequency instance.

24. The method of claim 18, wherein the information related to the interfering data transmission comprises control information carried by the interfering data transmission.

25. The method of claim 18, wherein the information related to the interfering data transmission originates from a different transmit point than the interfering data transmission.

26. The method of claim 18 further comprising:
unsuccessfully attempting to decode the interference signal prior to receiving the information related to the interfering data transmission;
determining that communicating information related to the interfering data transmission is more efficient than communicating information related to the serving data transmission after unsuccessfully attempting to decode the interference signal; and
requesting additional information related to the interfering data transmission prior to receiving the information related to the interfering data transmission.

27. A user equipment (UE), comprising:
a processor; and
a non-transitory computer readable storage medium storing programming for execution by the processor, the programming including instructions to:
receive an interference signal comprising a collision between a serving data transmission and an interfering data transmission at a first time-frequency instance of a scheduled environment, wherein the serving data transmission is transmitted from a base station to the UE, the interfering data transmission and the serving data transmission originating from different transmit points, and the interfering data transmission being intended for a different receiving device than the serving data transmission;
store the interference signal in memory;
request information related to the interfering data transmission;
receive the information related to the interfering data transmission in response to the request during a second time-frequency instance; and
decode the interference signal stored in memory using the information related to the interfering data transmission to obtain data carried by the serving data transmission.

* * * * *